(12) United States Patent
Yang et al.

(10) Patent No.: US 12,116,463 B2
(45) Date of Patent: Oct. 15, 2024

(54) MASTERBATCH WITH SEMI-CRYSTALLINE POLYOLEFIN CARRIER RESIN

(71) Applicant: Dow Global Technologies LLC, Midland, MI (US)

(72) Inventors: Yongyong Yang, Shanghai (CN); Dachao Li, Shanghai (CN); Yabin Sun, Shanghai (CN); Timothy J. Person, Pottstown, PA (US); Jeffrey M. Cogen, Flemington, NJ (US); Paul J. Caronia, Annadale, NJ (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 18/098,190

(22) Filed: Jan. 18, 2023

(65) Prior Publication Data
US 2023/0151162 A1    May 18, 2023

Related U.S. Application Data

(62) Division of application No. 16/961,441, filed as application No. PCT/CN2018/074908 on Feb. 1, 2018.

(51) Int. Cl.
| C08J 3/22 | (2006.01) |
| C08J 3/28 | (2006.01) |
| C08L 23/06 | (2006.01) |
| C08L 23/08 | (2006.01) |
| C08L 23/12 | (2006.01) |
| C08L 23/14 | (2006.01) |
| H01B 1/20 | (2006.01) |
| H01B 3/30 | (2006.01) |

(52) U.S. Cl.
CPC ............... *C08J 3/226* (2013.01); *C08J 3/28* (2013.01); *C08L 23/06* (2013.01); *C08L 23/0815* (2013.01); *C08L 23/12* (2013.01); *C08L 23/142* (2013.01); *C08L 2203/202* (2013.01); *C08L 2205/025* (2013.01); *C08L 2207/062* (2013.01); *H01B 1/20* (2013.01); *H01B 3/30* (2013.01)

(58) Field of Classification Search
CPC ........ C08F 10/00; C08F 10/02; C08F 110/00; C08F 110/02; C08F 210/00; C08F 210/02; C08L 23/00; C08L 23/04; C08L 23/06; C08L 23/08; C08L 23/0807; C08L 23/0815; C08J 3/226; C08K 5/0025
See application file for complete search history.

(56) References Cited

U.S. PATENT DOCUMENTS

| 3,886,056 | A |   | 5/1975 | Kitamaru et al. |
| 4,018,852 | A |   | 4/1977 | Schober |
| 4,173,556 | A | * | 11/1979 | Coran .................. C08L 77/02 |
|           |   |   |         | 524/297 |
| 4,368,280 | A |   | 1/1983 | Yui et al. |
| 5,005,204 | A |   | 4/1991 | Deaett |
| 5,346,961 | A |   | 9/1994 | Shaw et al. |
| 5,367,030 | A |   | 11/1994 | Gau et al. |
| 6,187,847 | B1 |   | 2/2001 | Cogen et al. |
| 6,191,230 | B1 |   | 2/2001 | Keogh et al. |
| 6,936,655 | B2 |   | 8/2005 | Borke et al. |
| 7,781,557 | B2 |   | 8/2010 | Fagrell et al. |
| 8,449,801 | B2 |   | 5/2013 | Hsiao et al. |
| 8,691,984 | B2 |   | 4/2014 | Yamaura |
| 9,147,784 | B2 |   | 9/2015 | Shirahige et al. |
| 9,464,181 | B2 |   | 10/2016 | Tong et al. |
| 2001/0056159 | A1 |   | 12/2001 | Jeong et al. |
| 2002/0198335 | A1 |   | 12/2002 | Bernier et al. |
| 2006/0173089 | A1 |   | 8/2006 | Jackson et al. |
| 2008/0176981 | A1 |   | 7/2008 | Biscoglio et al. |
| 2008/0317990 | A1 |   | 12/2008 | Runyan et al. |
| 2009/0181083 | A1 |   | 7/2009 | Holm et al. |
| 2015/0038637 | A1 |   | 2/2015 | Tong et al. |

FOREIGN PATENT DOCUMENTS

| CN | 1749303 |   | 3/2006 |   |
| CN | 103224668 A |   | 7/2013 |   |
| CN | 203224668 |   | 10/2013 |   |
| CN | 104356467 |   | 2/2015 |   |
| CN | 104744782 |   | 7/2015 |   |
| CN | 105037897 |   | 11/2015 |   |
| CN | 107814996 |   | 3/2018 |   |
| DE | 102006017346 |   | 1/2011 |   |
| EP | 2889323 |   | 7/2015 |   |
| JP | 2009209189 |   | 9/2009 |   |
| JP | 2016205440 |   | 12/2016 |   |
| WO | 199303093 |   | 2/1993 |   |
| WO | WO-2014100802 A1 | * | 6/2014 | .......... C08L 23/0815 |
| WO | 2015139516 |   | 9/2015 |   |

OTHER PUBLICATIONS

Yuan, Z. et al. Comprehensive Analytical Chemistry vol. 100 pp. 120-121 (Year: 2023).*
An Yanjie et al. Journal of Applied Polymer Science, pp. 2724-2731, vol. 125(4) (2012).
Pyun, H.C. et al. Journal of the Korean Nuclear Society vol. 14(2) pp. 70-77 (1982).
Wild et al. J. Poly. Sci. Polv. Phys. Ed., vol. 20, pp. 441-455 (1982).

\* cited by examiner

*Primary Examiner* — John M Cooney
*Assistant Examiner* — Jeffrey S Lenihan

(57) ABSTRACT

A coagent masterbatch comprising a semi-crystalline polyolefin carrier resin and an alkenyl-functional coagent. An electron-beam curable formulation comprising the coagent masterbatch and a polyolefin compound. A method of making the masterbatch and formulation; an electron-beam-cured polyolefin product prepared therefrom; a manufactured article comprising or made from the masterbatch, formulation, or product; and a method of using the manufactured article.

5 Claims, No Drawings

MASTERBATCH WITH SEMI-CRYSTALLINE POLYOLEFIN CARRIER RESIN

FIELD

Polyolefin compositions, electron beam curing, methods and articles.

INTRODUCTION

Patent publications include CN103865420 (A), DE102006017346A1, EP1433811A2, EP2889323A1, U.S. Pat. No. 5,367,030, 6,187,847B1, 6,191,230B1, 6,936, 655B2, US20020198335A1, US20080176981A1, U.S. Pat. No. 8,449,801B1, 8,691,984B2, 9,147,784B2.

CN103865420 (A) to G.-f. Chou, et al. for solar battery plate encapsulating structure. The composition of paragraph is made by direct compounding and once made is used directly to make a film. The composition has 110.1 total weight parts and is made from 100 weight parts of an HDPE having melt index ($I_2$) 0.04 g/10 min., 2 weight parts (1.82 weight percent) of triallyl propyl isocyanuric acid ester, 6 weight parts of $TiO_2$, 2 weight parts of vinyl tri (beta-methoxyethoxy) silane, and 0.1 weight part of 2-hydroxy-4-benzophenone.

DE102006017346A1 to A. a. Nichtnennung for migration stable masterbatch.

EP2889323A1 to S. Deveci et al. for polymer composition comprising carbon black and a carrier polymer for the carbon black.

U.S. Pat. No. 9,147,784B2 to Y. Shirahige et al. for sealing material sheet for solar cell module.

A masterbatch is a solid or liquid additive concentrate formulation used for conveying an additive into a host polymer in need thereof. Upon being cured the host polymer, sometimes called a host resin, base resin, or base polymer, forms a cured product that comprises network polymer or matrix (e.g., thermoset). The additive may be used to enhance the rate or extent of curing of the host polymer or enhance the performance of the cured product. The typical masterbatch comprises the additive and a carrier resin, sometimes called a carrier polymer. The formulation is made by mixing or blending a smaller amount of the masterbatch with a significantly larger amount of the host polymer. The concentration of the additive in the masterbatch is significantly higher than its concentration in the formulation.

Electron-beam irradiation is useful in a method of curing (crosslinking) polyolefins. The method comprises applying a dose of electron-beam irradiation to an (electron beam)-curable (EBC) polyolefin compound to give a cured polyolefin product. The method forms covalent bonds directly between polyolefin macromolecules of the EBC polyolefin compound. The electron-beam curing method may be used to cure various types of polyolefins including low density polyethylene (LDPE), linear low density polyethylene (LLDPE), and high density polyethylene (HDPE).

We introduce problems of: (a) how to improve hot creep (hot set) performance of electron-beam cured polyethylenes, (b) how to increase electron-beam irradiation curing of (electron beam)-curable (EBC) polyolefin compounds, and (c) how to make a stable coagent masterbatch.

Crosslinked low density polyethylene (XLDPE) and crosslinked linear low density polyethylene (XLLDPE) are used in various industrial applications wherein they are exposed to high operating temperatures, such as hot water pipes and insulation layers of electrical power cables. For these applications the crosslinked polyethylenes should have adequate hot creep (hot set) performance (i.e., retain its shape at operating temperature). Hot creep performance of (electron beam)-crosslinked high density polyethylene is usually weaker than that of (electron beam)-crosslinked linear low density polyethylene. Thus, merely blending a high density polyethylene into a linear low density polyethylene followed by electron-beam curing of the blend would not be expected to improve hot creep performance relative to that of the linear low density polyethylene alone.

If the dose of electron-beam irradiation is too high, undesirable side-effects occur. These include generating excessive amounts of heat, electrical charges, and/or $H_2$ gas. Excessive heat can lead to oxidation or deterioration of the cured polyolefin product. Excessive $H_2$ gas can lead to bubble formation in the cured polyolefin product. Excessive electrical charges can lead to electrical discharges from the cured polyolefin product. If the applied dose is too low, the compound does not adequately cure or reach a sufficient cure state (extent of curing or crosslink density), and the performance of the incompletely cured polyolefin product may be unsuitable for an intended purpose such protecting a cable.

Severity of the problems may be attenuated by mixing a minor amount of coagent additive into the EBC polyolefin compound to give an (electron beam)-curable (EBC) formulation comprising the EBC polyolefin compound and the coagent. The EBC formulation can be cured at a lower dose of the electron-beam irradiation than the dose used to cure the EBC polyolefin compound without coagent. Also, by virtue of the additional crosslinking effect of multivalent crosslinking groups derived from the coagent, the resulting cured polyolefin product can reach an equal or greater cure state than that of a comparative cured polyolefin product prepared without the coagent at the same lower EB dose. All other things being equal, the higher the loading of the coagent in the EBC formulation, the lower the dose of electron-beam irradiation that may be used to achieve a given cure state.

The EBC polyolefin compound used as a host polymer in coatings on wire and cable may be a polyethylene such as a low density polyethylene (LDPE) or a linear low density polyethylene (LLDPE). The typical coagent for these coatings has a polar backbone or substructure to which two or more alkenyl groups are bonded, such as triallyl isocyanurate (TAIC). It can be problematic to store an EBC formulation of the LDPE and/or LLDPE (host polymer) and 0.5 wt % or higher coagent without sweat out of coagent at room temperature. The rate and/or extent of sweat out may worsen with increasing storage time and/or temperature (an elevated temperature above room temperature and below the melting temperature of the LDPE and/or LLDPE). The more sweat out that occurs, the less effective is electron-beam curing of the EBC formulation.

To target higher loadings of coagent in the EBC formulation, porous polymer pellets may be tried. Porous polymer pellets are commercially available. For example, Membrana GmbH, Obernburg, Germany, supply ACCUREL XP and ACCUREL MP brands of porous polymer pellets. These porous polymer pellets are composed of polypropylene, HDPE, LDPE, LLDPE, EVA, EMA, PC, PMMA, PA6, PA12, PS, SBC, SAN, PET, or Bio Polyester, PLA. These porous pellets are said to have an additive loading capacity of up to 50% to 70% depending on the particular product and additive being loaded.

Problems with porous polymer pellets include limited polymer selection and leakage of additive from pores of loaded pellets. Problems are more acute when the additive is a liquid, especially one of low surface tension and low viscosity at room temperature (23 degrees Celsius (° C.)). When porous polymer pellets are squeezed or compressed, such as when they are being loaded with additive or the loaded pellets are being transported or fed, the squeezing/compressing can push the liquid additive out of the pores of the porous polymer pellets. Any resulting product that contains or is prepared from the loaded porous polymer pellets may have an insufficient quantity of the additive for its intended use.

SUMMARY

We conceived a technical solution to one, two or more of the introduced problems of problems of: (a) how to improve hot creep (hot set) performance of electron-beam cured polyethylenes, (b) how to increase electron-beam irradiation curing of (electron beam)-curable (EBC) polyolefin compounds, and (c) how to make a stable coagent masterbatch. The technical solution provides an alternative to using porous polymer pellets to carry the coagent and, unlike porous polymer pellets, is unpredictably able to carry high loadings of coagent including a liquid coagent, such as triallyl isocyanurate, without sweat out during storage thereof. The technical solution comprises a carrier resin that is a semi-crystalline polyolefin. The semi-crystalline polyolefin may be substantially nonporous and useful for conveying the coagent into an EBC polyolefin compound (host polymer) such as a LDPE and/or LLDPE. Surprisingly, despite its semi-crystalline, nonporous nature, the semi-crystalline polyolefin is capable of carrying high loadings of the coagent, such as up to 20 wt %, and may be more, of TAIC, without sweat out thereof at room temperature during storage or leakage during handling comprising compressing or squeezing. Even at elevated temperature (above room temperature and below the melting temperature of the semi-crystalline polyolefin), the inventive carrier resin may be capable of carrying high loadings of the liquid or solid coagent without seepage or leakage thereof.

Without being bound by theory, we believe that the semi-crystalline polyolefin defines tortuous pathways therein that trap the coagent, releasing the coagent only after the crystalline portion of the semi-crystalline polyolefin has been melted. Without being bound by theory, we believe this advantage prevents the coagent from prematurely flowing out of heated semi-crystalline polyolefin, such as granules or pellets, before they can be fully mixed into a melt of an EBC polyolefin compound (host polymer).

The technical solution enables and includes an inventive coagent masterbatch that comprises a semi-crystalline polyolefin (carrier resin) containing an alkenyl-functional coagent. Also inventive are an EBC formulation comprising the inventive masterbatch and an EBC polyolefin compound (host polymer); a cured polyolefin product prepared by electron-beam irradiating the EBC formulation; methods of making and using same masterbatch, formulation, and product; and articles containing or made from same masterbatch, formulation, and product. We believe that the cured polyolefin product has both direct polyolefin-polyolefin bonds and polyolefins crosslinked via a multivalent crosslinking group derived from the alkenyl-functional coagent.

A formulator can use the inventive masterbatch to quickly make the EBC formulation and a manufacturer can use the EBC formulation to make cured polyolefin products with fewer defects relative to a comparative EBC polyolefin compound (host polymer) free of coagent and cured polyolefin product made therefrom. Advantageously, the sweat out/leakage stability of the inventive coagent masterbatch enables the formulator and manufacturer to stockpile the coagent masterbatch. It also enables the manufacturer to use coagent masterbatch from the stockpile to make the EBC formulation just prior to electron-beam curing in order to shorten or eliminate the storage of the EBC formulation, thereby avoiding any risk of coagent sweat out from the EBC formulation.

DETAILED DESCRIPTION

The Summary and Abstract are incorporated here by reference. Examples of embodiments include the following numbered aspects.

Aspect 1. A coagent masterbatch comprising (A) a semi-crystalline polyolefin carrier resin and (B) an alkylene-functional coagent disposed in the (A) semi-crystalline polyolefin carrier resin; wherein (A) is 80.0 to 99.9 weight percent (wt %), alternatively 80.0 to 99.0 wt %, alternatively 80.0 to 98.9 wt %, alternatively 84 to 98.9 wt %, alternatively 84 to 98.8 wt %, alternatively 85 to 94 wt %, and (B) is from 20.0 to 0.1 wt %, alternatively 20.0 to 1.0 wt %, alternatively 20.0 to 1.1 wt %, alternatively 16 to 1.1 wt %, alternatively 16 to 1.2 wt %, alternatively 15 to 6 wt %, respectively, of the combined weight of constituents (A) and (B); wherein the (A) semi-crystalline polyolefin carrier resin has a crystallinity of from 55.0 to less than 100 weight percent (wt %) as measured by Crystallinity Test Method using differential scanning calorimetry (DSC); wherein when the (A) semi-crystalline polyolefin carrier resin is a semi-crystalline polyethylene, the semi-crystalline polyethylene has a density of greater than 0.935 gram per cubic centimeter ($g/cm^3$). The (A) semi-crystalline polyolefin carrier resin is in a divided solid form such as powder, granules, pellets, or a combination of any two or more thereof. The term "when" above refers to a non-limiting embodiment of the (A) semi-crystalline polyolefin carrier resin. The coagent masterbatch includes additional embodiments when the (A) semi-crystalline polyolefin carrier resin is not the semi-crystalline polyethylene.

Aspect 2. The coagent masterbatch of aspect 1 characterized by any one of limitations (i) to (x): (i) the coagent masterbatch is free of (C) an (electron beam)-curable polyolefin compound (host polymer) other than constituent (A); (ii) the coagent masterbatch further comprises at least one additive independently selected from optional additives (D) to (L): (D) a flame retardant, (E) an antioxidant, (F) a processing aid, (G) a colorant, (H) a metal deactivator, (I) an (unsaturated carbon-carbon bond)-free hydrolyzable silane, (J) a corrosion inhibitor, (K) a hindered amine light stabilizer, and (L) an ethylene-based copolymer that is different than constituents (A) and (C) and is an ethylene/($C_4$-$C_{20}$) alpha-olefin copolymer, an ethylene/unsaturated carboxylic ester copolymer, or a propylene/ethylene-based copolymer; (iii) the coagent masterbatch does not contain an alkenyl-functional coagent-containing porous resin (e.g., a porous LDPE, EVA copolymer, or EEA copolymer powder, granules or pellets having pores containing an alkenyl-functional coagent); (iv) the coagent masterbatch does not contain any porous resin; (v) the coagent masterbatch consists of constituents (A) and (B) (i.e., the coagent masterbatch does not contain any constituent other than (A) and (B) and the above wt % values for (A) and (B) are of the total weight of the coagent masterbatch (100.00 wt %)); (vi) both (i) and (ii); (vii) both (i) and (iii); (viii) both (i) and (iv); (ix) the coagent masterbatch can be maintained for at least 20 days at a temperature of 23° C. without sweat out of the alkenyl-functional coagent as measured by Sweat Out Test Method (Quantitative, described later); and (x) both (ix) and any one of (i) to (viii).

Aspect 3. The coagent masterbatch of aspect 1 or 2 wherein the (A) semi-crystalline polyolefin carrier resin comprises, alternatively consists essentially of, alternatively consists of any one of (i) to (viii): (i) a semi-crystalline medium density polyethylene; (ii) a semi-crystalline high density polyethylene; (iii) a semi-crystalline polypropylene; (iv) a semi-crystalline ethylene/propylene copolymer; (v) a semi-crystalline poly(ethylene-co-alpha-olefin) copolymer; (vi) a combination (e.g., mixture or blend) of any two or more of (i), (ii) and (v); (vii) the (A) semi-crystalline polyolefin carrier resin has a crystallinity of 57.5 to <100 wt %, alternatively 60.0 to <100 wt %, alternatively 65 to <100 wt %, alternatively 70.0 to <100 wt % (Crystallinity Test Method using DSC); or (viii) limitation (vii) and any one of limitations (i) to (vi).

Aspect 4. The coagent masterbatch of any one of aspects 1 to 3 wherein the (A) semi-crystalline polyolefin carrier resin has any one of (i) to (viii): (i) a density of greater than 0.936 g/cm$^3$, alternatively at least 0.940 g/cm$^3$, and is a polyethylene; (ii) a density of 0.89 to 0.946 g/cm$^3$, alternatively 0.900 to 0.940 g/cm$^3$, and is a polypropylene; (iii) a crystallinity of 60.0 to <100 wt %, alternatively 65 to <100 wt %, alternatively 70.0 to <100 wt %, alternatively 75 to <100 wt % (Crystallinity Test Method using DSC) and is a polyethylene; (iv) a melt index ($I_2$, 190° C./2.16 kg load) of 0.1 to 20 grams per 10 minutes (g/10 min.), alternatively 0.2 to 20 g/10 min., alternatively 0.5 to 10 g/10 min., all measured according to the Melt Index Test Method (described later) and is a polyethylene or a melt flow rate (MFR) of 0.5 to 20 g/10 min. (230° C./2.16 kg load) measured according to the Melt Flow Rate Test Method (described later) and is a polypropylene; (v) a molecular weight distribution (MWD) that is monomodal; (vi) a MWD that is multimodal, alternatively bimodal; (vii) wherein the combined weight of constituents (A) and (B) is from 50 to 100 wt % alternatively from 70 to 100 wt %, alternatively from 80 to 100 wt %, alternatively from 90 to 100 wt %, alternatively from 50 to 99.9 wt % alternatively from 70 to 99.9 wt %, alternatively from 80 to 99.9 wt %, alternatively from 90 to 99.9 wt % of the coagent masterbatch; (viii) any two or limitations (i) to (vii).

Aspect 5. The coagent masterbatch of any one of aspects 1 to 4 wherein the (B) alkenyl-functional coagent is as described by any one of limitations (i) to (viii): (i) (B) is 2-allylphenyl allyl ether; 4-isopropenyl-2,6-dimethylphenyl allyl ether; 2,6-dimethyl-4-allylphenyl allyl ether; 2-methoxy-4-allylphenyl allyl ether; 2,2'-diallyl bisphenol A; O,O'-diallyl bisphenol A; or tetramethyl diallylbisphenol A; (ii) (B) is 2,4-diphenyl-4-methyl-1-pentene or 1,3-diisopropenylbenzene; (iii) (B) is triallyl isocyanurate; triallyl cyanurate; triallyl trimellitate; N,N,N',N',N'',N''-hexaallyl-1,3,5-triazine-2,4,6-triamine; triallyl orthoformate; pentaerythritol triallyl ether; triallyl citrate; or triallyl aconitate; (iv) (B) is trimethylolpropane triacrylate, trimethylolpropane trimethylacrylate, ethoxylated bisphenol A dimethacrylate, 1,6-hexanediol diacrylate, pentaerythritol tetraacrylate, dipentaerythritol pentaacrylate, tris(2-hydroxyethyl) isocyanurate triacrylate, or propoxylated glyceryl triacrylate; (v) (B) is a polybutadiene having at least 50 wt % 1,2-vinyl content or trivinyl cyclohexane; (vi) (B) is an alkenyl-functional organosiloxane of formula (I): [$R^1$, $R^2SiO_{2/2}$]$_n$ (I), wherein subscript n is an integer greater than or equal to 3; each $R^1$ is independently a ($C_2$-$C_4$)alkenyl or a $H_2C=C(R^{1a})-C(=O)-O-(CH_2)_m-$ wherein $R^{1a}$ is H or methyl and subscript m is an integer from 1 to 4; and each $R^2$ is independently H, ($C_1$-$C_4$)alkyl, phenyl, or $R^1$; (vii) (B) is an alkenyl-functional monocyclic organosiloxane of formula (II): ($R^1$)$_x$Si(OR$^2$)$_{(4-x)}$ (II), wherein subscript x is an integer from 0 to 4; each $R^1$ is independently a ($C_2$-$C_4$)alkenyl or a $H_2C=C(R^{1a})-C(=O)-O-(CH_2)_m-$ wherein $R^{1a}$ is H or methyl and subscript m is an integer from 1 to 4; and each $R^2$ is independently H, ($C_1$-$C_4$)alkyl, phenyl, or $R^1$; with the proviso that the alkenyl-functional monocyclic organosiloxane of formula (II) contains from 2 to 4 $R^1$ groups; (viii) a combination or any two or more of (i) to (vii).

Aspect 6. A method of storing a coagent masterbatch, the method comprising maintaining for at least 20 days the coagent masterbatch of any one of aspects 1 to 5 at a temperature from 20° to 25° C. to give a stored coagent masterbatch without sweat out of the alkenyl-functional coagent as measured by Sweat Out Test Method (Quantitative, described later).

Aspect 7. An (electron beam)-curable formulation comprising the coagent masterbatch of any one of aspects 1 to 5, or the stored coagent masterbatch made by the method of aspect 6, and (C) an electron-beam curable (EBC) polyolefin compound.

Aspect 8. The (electron beam)-curable formulation of aspect 7 characterized by any one of limitations (i) to (xiii): (i) the (C) EBC polyolefin compound is a low density polyethylene (LDPE) having a density from 0.910 to 0.925 g/cm$^3$; (ii) the (C) EBC polyolefin compound is a linear low density polyethylene (LLDPE) having a density from 0.910 to 0.925 g/cm$^3$; (iii) the (C) EBC polyolefin compound is a medium density polyethylene (MDPE) having a density from 0.926 to 0.940 g/cm$^3$; (iv) the (C) EBC polyolefin compound is a high density polyethylene (HDPE) having a density from 0.941 to 0.990 g/cm$^3$; (v) the (C) EBC polyolefin compound is a polyethylene elastomer selected from elastomers based on ethylene copolymers such as an ethylene-propylene rubber (EPR), an ethylene-1-butene rubber (EBR), and an ethylene-1-octene rubber (EOR); (vi) the (C) EBC polyolefin compound is an ethylene/($C_3$-$C_{20}$) alpha-olefin) copolymer; (vii) the (C) EBC polyolefin compound is an ethylene-propylene copolymer (EPP); (viii) the (C) EBC polyolefin compound is an ethylene-propylene-diene monomer (EPDM) copolymer; (ix) the (C) EBC polyolefin compound is a combination of any two or more of (i) to (viii); (x) the (electron beam)-curable formulation further comprises at least one additive that is not a constituent of the coagent masterbatch and is independently selected from optional additives (D) to (L): (D) a flame retardant, (E) an antioxidant, (F) a processing aid, (G) a colorant, (H) a metal deactivator, (I) an (unsaturated carbon-carbon bond)-free hydrolyzable silane, (J) a corrosion inhibitor, (K) a hindered amine light stabilizer, and (L) an ethylene-based copolymer additive that is different than constituents (A) and (C) and is an ethylene/($C_4$-$C_{20}$) alpha-olefin copolymer, an ethylene/unsaturated carboxylic ester copolymer, or a propylene/ethylene-based copolymer; (xi) limitation (x) and any one of limitations (i) to (viii); (xii) (B) is from 0.1 to 20 wt %, alternatively 0.5 to 15 wt %, alternatively 5 to 15 wt %, alternatively 5 to 14 wt % of the combined weight of constituents (A), (B) and (C); and (xiii) limitation (xii) and any one of limitations (i) to (xi).

Aspect 9. A method of making an (electron beam)-curable formulation, the method comprising mixing together a divided solid form of the coagent masterbatch of any one of aspects 1 to 5, or the stored coagent masterbatch made by the method of aspect 6, and a (C) EBC polyolefin compound in divided solid or melt form so as to give a mixture; and melt mixing or extruding the mixture so as to make the (electron beam)-curable (EBC) formulation. In some aspects the EBC formulation that is made is the EBC formulation of aspect 8. The extruded EBC formulation may be pelletized to give the EBC formulation as solid pellets. Alternatively, the extruded EBC formulation may be cooled to give the EBC formulation as a shaped solid such as an insulation layer on a cable.

Aspect 10. A method of electron-beam curing a formulation in need thereof, the method comprising irradiating the EBC formulation of aspect 7 or 8, or the (electron beam)-curable formulation made by the method of aspect 9, with an effective dose of electron-beam irradiation so as to give an electron-beam cured polyolefin product. In some aspects coagent masterbatch is the stored coagent masterbatch made by the method of aspect 6. In some aspects the method further comprises a preliminary step before the irradiating step of maintaining for from 1 to 100 days, alternatively from 5 to 50 days, alternatively from 14 to 20 days the coagent masterbatch of any one of aspects 1 to 5 at a temperature from 20° to 25° C. to give a stored coagent masterbatch without sweat out of the alkenyl-functional coagent as measured by Sweat Out Test Method (described later), wherein the coagent masterbatch of the EBC formulation comprises the stored coagent masterbatch. The EBC formulation in a shaped solid form may be cured by the method to give a shaped form of the electron-beam-cured polyolefin product.

Aspect 11. An electron-beam-cured polyolefin product made by the method of aspect 10. The product may have a defined shape such as a coating, film, or molded or extruded shape.

Aspect 12. A manufactured article comprising the electron-beam-cured polyolefin product of aspect 11 and a component in operative contact therewith.

Aspect 13. A coated conductor comprising a conductive core and a polymeric layer at least partially surrounding the conductive core, wherein at least a portion of the polymeric layer comprises the electron-beam-cured polyolefin product of aspect 11.

Aspect 14. A method of conducting electricity, the method comprising applying a voltage across the conductive core of the coated conductor of aspect 13 so as to generate a flow of electricity through the conductive core.

Additive: a solid or liquid compound or substance that imparts a desired property to a host polymer, or to a formulation comprising a masterbatch and host polymer, or to a reaction product prepared therefrom. The property may be a chemical, electrical, mechanical, optical, physical, and/or thermal property.

Alpha-olefin: a compound of formula (I): $H_2C\!=\!C(H)\!-\!R$ (I), wherein R is a straight chain alkyl group.

Carrier resin: a divided solid (particulate) polymer used for temporarily holding and later releasing an additive.

Coagent: a multifunctional compound that enhances crosslinking of (co) polymer macromolecules during a curing method. A single coagent molecule may react with two, three, or more (co) polymer macromolecules to make crosslinked (co) polymer macromolecular products wherein two, three, or more of the (co) polymer macromolecules have been covalently bonded to a same multivalent crosslinking group derived from the coagent molecule. Coagent is also known as a curing coagent or crosslinking cogent. Typical coagents are acyclic or cyclic compounds that contain carbon atoms or silicon atoms in their respective backbone or ring substructure. Thus, the backbone or ring substructure of a coagent is based on carbon (carbon-based substructure) or silicon (silicon-based substructure). Coagent is different in structure and function than a cure agent.

Coagent masterbatch: A masterbatch wherein the additive comprises a coagent. The coagent masterbatch may contain at least 45 wt %, alternatively at least 50 wt %, alternatively at least 55 wt %, alternatively at least 70 wt %, alternatively at least 80 wt %, alternatively at least 90 wt % of the (A) semi-crystalline polyolefin carrier resin; all based on total weight of the coagent masterbatch. The coagent masterbatch may contain from 55 to 1 wt %, alternatively 50 to 1 wt %, alternatively 45 to 1 wt %, alternatively 30 to 1 wt %, alternatively 20 to 1 wt %, alternatively 10 to 1 wt % of the (B) alkenyl-functional coagent. The coagent masterbatch may be free of: (i) an ethylene/silane copolymer, (ii) an ethylene/vinyl acetate (EVA) copolymer, (iii) an ethylene/alkyl acrylate copolymer (e.g., EEA copolymer), (iv) carbon black; (v) a pigment or colorant; (vi) a filler; (vii) any two, alternatively any six of (i) to (vi). The coagent masterbatch may have from >0 to 5 wt % of any other carrier resin such as a low density polyethylene (LDPE), a linear low density polyethylene (LLDPE), an ethylene/alpha-olefin copolymer, an EEA copolymer, a polypropylene, a nylon (e.g., Nylon 6 or 66), a BPA-PC, a polycarbonate, a BPA-PS, a polysulfone, or a polyphenylene oxide; alternatively the coagent masterbatch may be free of any carrier resin, or any resin, other than the (A) semi-crystalline polyolefin carrier resin. The coagent masterbatch may further comprise a filler. The filler may be calcium carbonate, zinc borate, zinc molybdate, zinc sulfide, carbon black, talc, magnesium oxide, zinc oxide, or a clay. The coagent masterbatch may be free of any additive that prevents electron-beam curing of the host polymer.

Coated conductor: a material for conducting electricity at least partially covered by a layer of a protective material. An example is an electrical power cable.

Comonomer composition distribution (CCD) or chemical composition distribution is the variability of the amounts of comonomeric units incorporated into copolymer macromolecules. When the amount of comonomeric units incorporated vary over a wide range from copolymer macromolecule to copolymer macromolecule, the CCD is said to be "broad". When the amount of comonomeric units incorporated into the copolymer macromolecules is relatively consistent from copolymer macromolecule to copolymer macromolecule, the CCD is said to be "narrow". A measurement of CCD is comonomer distribution breadth index (CDBI).

Comonomer distribution breadth index (CDBI) is the weight percent (wt %) of copolymer molecules having a comonomeric unit content within 50 percent (i.e., ±50%) of the median total molar comonomeric unit content. Such a relatively high CDBI value indicates that the copolymer molecules are relatively uniform in comonomeric unit content. The CDBI value of a linear polyethylene homopolymer, which does not contain a comonomer, is defined to be 100%. When a CDBI value for a first copolymer is higher than that of a second copolymer, the higher CDBI value indicates that the comonomer distribution of the first copolymer is more controlled or limited than the comonomer distribution of the second copolymer.

(Co) polymer: polymer (homopolymer) and/or copolymer. A homopolymer is a macromolecule composed of monomeric units derived from only one monomer and no comonomer units. A copolymer is a macromolecule or collection of macromolecules having monomeric units and one or more different types of comonomeric units, wherein the monomeric units comprise on average per molecule a majority of the total units. The copolymer's monomeric units are made by polymerizing a first monomer and the one or more different types of comonomeric units are made by polymerizing one or more different second or more monomers, referred to as comonomers. Monomers and comonomers are polymerizable molecules. A monomeric unit, also called a monomer unit or "mer", is the largest constitutional unit contributed by (derived from) a single monomer molecule to the structure of the macromolecule(s). A comonomeric unit, also called a comonomer unit or "comer", is the largest constitutional unit contributed by (derived from) a single comonomer molecule to the structure of the macromolecule(s). Each unit is typically divalent (prior to any curing or crosslinking). A "bipolymer" is a copolymer made from a monomer (e.g., ethylene) and one type of comonomer (e.g., 1-hexene). A "terpolymer" is a copolymer made from a monomer (e.g., ethylene) and two different types of comonomers (e.g., propylene and 1,3-butadiene). An ethylenic-based copolymer has 50 to less than 100 wt % monomeric units derived from ethylene ($CH_2=CH_2$) and from greater than 0 to 50 wt % comonomeric units derived from one or more comonomers. A propylene-based copolymer has 50 to less than 100 wt % monomeric units derived from propylene ($CH_2=CH_2CH_3$) and from greater than 0 to 50 wt % comonomeric units derived from one or more comonomers (e.g., ethylene, butadiene).

Cure agent: a radical-generating compound (in situ) that upon activation forms a free-radical and initiates or enhances reactions involving crosslinking of macromolecules. Activation of the cure agent may be achieved by subjecting the cure agent to heat or light. Examples of cure agents are peroxides, diazo-functional organic compounds, and 2,3-dimethyl-2,3-diphenylbutane. Examples of peroxides are hydrogen-organic peroxides of formula H—O—O—R and organic peroxides of formula R—O—O—R, wherein each R is independently a hydrocarbyl group.

Curing: crosslinking to form a crosslinked product (network polymer).

Day: any consecutive 24 hour period.

Divided solid: a particulate material in a state of matter characterized by relatively stable shape and volume. Examples are powers, granules, and pellets.

Effective dose: a quantity sufficient to result in crosslinking of a polyolefin in need thereof and receiving the quantity.

Electron-beam curable: capable of being cured by irradiation (treatment) with high-energy beta radiation such as from a high-energy electron-beam accelerator. The irradiation induces covalent bonding (crosslinking) between adjacent macromolecules to form a network polymer.

High density polyethylene (HDPE): having a density from 0.941 to 0.990 g/cm$^3$, an alpha-olefin comonomeric unit content greater than 0 wt %, and short chain branching.

Linear low density polyethylene (LLDPE): having density from 0.910 to 0.925 g/cm$^3$, an alpha-olefin comonomeric unit content greater than 0 wt %, and short chain branching. The LLDPE may have a comonomer distribution breadth index (CDBI) of from 70 to less than 100 weight percent.

Low density polyethylene (LDPE): a polyethylene homopolymer (0 wt % comonomeric unit content, CDBI=100%, free of short-chain branching) having density from 0.910 to 0.925 g/cm$^3$. LDPE may be made via free-radical polymerization mechanism in a catalyst-free, high pressure polymerization process.

Medium density polyethylene (MDPE): having a density from 0.926 to 0.940 g/cm$^3$. Manufactured article: man-made (by hand or machine) thing.

Masterbatch: see Introduction.

Melt: a liquid formed by heating a solid material above its highest melting temperature.

Polyolefin: a macromolecule, or collection of macromolecules, composed of constitutional units derived from polymerizable olefins.

Semi-crystalline: a solid material having a first region that is neither crystalline nor amorphous and a second region that is amorphous. Having a percent crystallinity, typically between 10% and 90%, as measured by the Crystallinity Test Method described later.

Shaped solid: a state of matter of relatively constant volume and external form, which is man-made (by hand or machine). E.g., extruding, molding, or coating a fluid into the external form, followed by cooling the external form in place to give a shaped solid.

Storing: keeping or maintaining.

Sweat out: slow release of a liquid from a solid material containing the liquid therein.

The coagent masterbatch, EBC formulation, and cured polyolefin product may be referred to herein as the inventive masterbatch, formulation, and product, respectively.

The inventive masterbatch, formulation, and/or product may be free of an additive that is an acid condensation catalyst. Examples of the acid condensation catalyst are (i) an organosulfonic acid, an organophosphonic acid, or a hydrogen halide; (ii) an organosulfonic acid; (iii) an alkyl-substituted arylsulfonic acid; (iv) an alkyl-substituted arylsulfonic acid wherein there is/are 1 or 2 ($C_5$-$C_{20}$)alkyl substituent(s) and 1 aryl group that is phenyl or naphthyl; (v) a ($C_1$-$C_5$)alkylphosphonic acid, wherein the ($C_1$-$C_5$)alkyl is unsubstituted or substituted with one —$NH_2$ group; (vi) HF, HCl, or HBr; (vii) a Lewis acid; or (viii) a combination of any two or more of (i) to (vii).

The inventive masterbatch, formulation, and/or product may be free of $TiO_2$. The inventive masterbatch and/or formulation may have greater than or equal to 2.0 weight percent of coagent, may have a MI greater than or equal to 0.1 g/10 minutes, or a combination of any two or more thereof. The inventive masterbatch, formulation, and/or product may be free of a cure agent such as a peroxide such as a hydrogen-organic peroxide or an organic peroxide.

Coagent masterbatch. In some aspects the coagent masterbatch is a divided solid such as a powder, granules and/or pellets.

Electron-beam curable formulation. The total weight of all constituents and additives in the inventive masterbatch, formulation, and product independently is 100.00 wt %. The electron-beam curable formulation may be a one-part formulation, alternatively a two-part formulation. The two-part formulation may comprise first and second parts, wherein the first part consists essentially of the coagent masterbatch and the second part consists essentially of the (C) EBC polyolefin compound.

Constituent (A) semi-crystalline polyolefin carrier resin. The semi-crystalline polyolefin carrier resin may be a semi-crystalline polyethylene that is a semi-crystalline medium density polyethylene (MDPE), a semi-crystalline high density polyethylene (HDPE), or a combination thereof. Constituent (A) semi-crystalline polyolefin carrier resin may be in any divided solid form such as powder, granules, pellets, or a combination of any two or more thereof.

The semi-crystalline HDPE may have a maximum density of 0.970 g/cm$^3$, alternatively at most 0.960 g/cm$^3$, alternatively at most 0.950 g/cm$^3$. The semi-crystalline HDPE may have a density of from >0.935 to 0.970 g/cm$^3$, alternatively 0.935 to 0.965 g/cm$^3$. The density of the (A) may be measured by ASTM D-1505, Test Method for Density of Plastics by the Density-Gradient Technique.

The (A) semi-crystalline polyolefin carrier resin may have a crystallinity of at least 55 wt %, alternatively at least 58 wt %, alternatively at least 59 wt %. In any one of the immediately preceding aspects the crystallinity may be at most 90 wt %, alternatively at most 80 wt %, alternatively at most 78 wt %. In some aspects the crystallinity is from 55 to 80 wt %, alternatively from 58 to 78 wt %, alternatively from 58 to 76 wt %, alternatively from 62 to 78 wt %, alternatively any one of 59±1 wt %, 62±1 wt %, 76±1 wt %, and 77±1 wt %. The crystallinity of a semi-crystalline polyolefin resin, such as (A) semi-crystalline polyolefin carrier resin, may be determined by differential scanning calorimetry (DSC) according to ASTM D3418-15 or the Crystallinity Test Method using DSC described later. For a semi-crystalline polyethylene resin, wt % crystallinity= ($\Delta H_f$*100%)/292 J/g. For a semi-crystalline polypropylene resin, wt % crystallinity=($\Delta H_f$*100%)/165 J/g. In the respective equations $\Delta H_f$ is the second heating curve heat of fusion for the polyethylene resin or polypropylene resin, as the case may be, * indicates mathematical multiplication, / indicates mathematical division, 292 J/g is a literature value of the heat of fusion ($\Delta H_f$) for a 100% crystalline polyethylene, and 165 J/g is a literature value of the heat of fusion ($\Delta H_f$) for a 100% crystalline polypropylene. Preferably, crystallinity is determined by DSC according to the Crystallinity Test Method described later.

The (A) semi-crystalline polyolefin carrier resin may have a melt index ($I_2$, 190° C./2.16 kg load) of 10 to 20 g/10 min., alternatively 0.1 to 10 g/10 min., alternatively 0.20 to 9 g/10 min. The $I_2$ may be determined by ASTM D1238 as described later.

The (A) semi-crystalline polyolefin carrier resin may be characterized by a molecular weight distribution (MWD) that is monomodal, alternatively bimodal.

The (A) semi-crystalline polyolefin carrier resin may be a semi-crystalline HDPE that is bimodal and has a density of from 0.950 to 0.958 g/cm³ and a melt index of from 0.20 to 0.40 g/10 min. The (A) semi-crystalline polyolefin carrier resin may be a semi-crystalline HDPE that is monomodal and has a density of from 0.930 to 0.970 g/cm³ and a melt index of from 0.65 to 9 g/10 min., alternatively a density from 0.935 to 0.965 g/cm³ and a melt index from 0.7 to 8.5 g/10 min.

Constituent (B) alkenyl-functional coagent. A molecule that contains a backbone or ring substructure and two or more propenyl, acrylate, and/or vinyl groups bonded thereto, or a collection of such molecules. In some aspects the backbone or substructure is composed of carbon atoms and optionally nitrogen atoms and is free of silicon atoms. In some aspects the backbone or substructure is composed of silicon atoms and optionally oxygen atoms.

When the backbone or substructure of (B) alkenyl-functional coagent is composed of carbon atoms and optionally nitrogen atoms and is free of silicon atoms, the (B) may be a propenyl-functional coagent as described by any one of limitations (i) to (v), a vinyl-functional coagent as described by any one of limitations (vi) to (vii), or a combination thereof as described in limitation (viii): (i) (B) is 2-allylphenyl allyl ether; 4-isopropenyl-2,6-dimethylphenyl allyl ether; 2,6-dimethyl-4-allylphenyl allyl ether; 2-methoxy-4-allylphenyl allyl ether; 2,2'-diallyl bisphenol A; O,O'-diallyl bisphenol A; or tetramethyl diallylbisphenol A; (ii) (B) is 2,4-diphenyl-4-methyl-1-pentene or 1,3-diisopropenylbenzene; (iii) (B) is triallyl isocyanurate ("TAIC"); triallyl cyanurate ("TAC"); triallyl trimellitate ("TA™"); N,N,N', N',N",N"-hexaallyl-1,3,5-triazine-2,4,6-triamine ("HATATA"; also known as N2,N2,N4, N4,N6,N6 hexaallyl-1,3,5-triazine-2,4,6-triamine); triallyl orthoformate; pentaerythritol triallyl ether; triallyl citrate; or triallyl aconitate; (iv) (B) is a mixture of any two of the propenyl-functional coagents in (i). Alternatively, the (B) may be an acrylate-functional conventional coagent selected from trimethylolpropane triacrylate ("TMPTA"), trimethylolpropane trimethylacrylate ("TMPTMA"), ethoxylated bisphenol A dimethacrylate, 1,6-hexanediol diacrylate, pentaerythritol tetraacrylate, dipentaerythritol pentaacrylate, tris(2-hydroxyethyl) isocyanurate triacrylate, and propoxylated glyceryl triacrylate; (vi) polybutadiene having at least 50 wt % 1,2-vinyl content; (vii) trivinyl cyclohexane ("TVCH") (viii) a combination or any two or more of the foregoing coagents. Alternatively, the (B) may be a coagent described in U.S. Pat. No. 5,346,961 or U.S. Pat. No. 4,018,852. In some aspects the (B) is the propenyl-functional coagent as described by any one of limitations (i) to (v). In some aspects the (B) is the propenyl-functional coagent selected from TAIC, TAC, TATM, HATATA, TMPTA, and TMPTMA; alternatively TAIC, TAC, and TMPTMA; alternatively TAIC; alternatively TAC; alternatively TA™; alternatively HATATA; alternatively TMPTA; alternatively TMPTMA.

When the backbone of substructure of (B) alkenyl-functional coagent is composed of silicon atoms and optionally oxygen atoms, the (B) may be an alkenyl-functional organosiloxane of any one of limitations (i) to (iv): (i) a monocyclic organosiloxane of formula (I): $[R^1,R^2SiO_{2/2}]_n$ (I), wherein subscript n is an integer greater than or equal to 3; each $R^1$ is independently a ($C_2$-$C_4$)alkenyl or a $H_2C$=C($R^{1a}$)—C(=O)—O—($CH_2$)$_m$— wherein $R^{1a}$ is H or methyl and subscript m is an integer from 1 to 4; and each $R^2$ is independently H, ($C_1$-$C_4$)alkyl, phenyl, or $R^1$, wherein in some aspects the coagent masterbatch is free of (i.e., lacks) a phosphazene base; (ii) an alkenyl-functional monocyclic organosiloxane of formula (II): $(R^1)_xSi(OR^2)_{(4-x)}$ (II), wherein subscript x is an integer from 0 to 4; each $R^1$ is independently a ($C_2$-$C_4$)alkenyl or a $H_2C$=C($R^{1a}$)—C(=O)—O—($CH_2$)$_m$— wherein $R^{1a}$ is H or methyl and subscript m is an integer from 1 to 4; and each $R^2$ is independently H, ($C_1$-$C_4$)alkyl, phenyl, or $R^1$; with the proviso that the alkenyl-functional monocyclic organosiloxane of formula (II) contains from 2 to 4, alternatively 2 or 3, alternatively 3 or 4, alternatively 2, alternatively 3, alternatively 4 $R^1$ groups. In some aspects the (B) is the monocyclic organosiloxane of formula (I). In some aspects the (B) is the monocyclic organosiloxane of formula (I), wherein subscript n is an integer 3 or 4; each $R^1$ is independently a ($C_2$-$C_4$)alkenyl; and each $R^2$ is ($C_1$-$C_4$)alkyl. In some aspects the (B) is the monocyclic organosiloxane of formula (I), wherein subscript n is an integer 3 or 4; each $R^1$ is independently a ($C_2$-$C_4$)alkenyl; and each $R^2$ is ($C_1$-$C_4$) alkyl. In some aspects the (B) is the monocyclic organosiloxane of formula (I), wherein subscript n is an integer 3 or 4; each $R^1$ is independently a ($C_2$)alkenyl (i.e., vinyl); and each $R^2$ is methyl.

In some aspects the (B) is the propenyl-functional coagent or the monocyclic organosiloxane of formula (I). In some aspects the propenyl-functional coagent is selected from TAIC, TAC, TATM, HATATA, TMPTA, and TMPTMA; alternatively TAIC, TAC, and TMPTMA; alternatively TAIC; alternatively TAC; alternatively TATM; alternatively HATATA; alternatively TMPTA; alternatively TMPTMA; and the monocyclic organosiloxane of formula (I) is selected from the monocyclic organosiloxane of formula (I), wherein subscript n is an integer 3 or 4; each $R^1$ is independently a ($C_2$-$C_4$)alkenyl; and each $R^2$ is ($C_1$-$C_4$)alkyl; alternatively the monocyclic organosiloxane of formula (I), wherein subscript n is an integer 3 or 4; each $R^1$ is independently a ($C_2$)alkenyl; and each $R^2$ is methyl.

Constituent (C) electron-beam curable (EBC) polyolefin compound ("Host Polymer"). The (C) EBC polyolefin compound may be a low density polyethylene (LDPE, linear low density polyethylene (LLDPE), medium density polyethylene (MDPE), high density polyethylene (HDPE), a polyolefin elastomer, an ethylene/($C_3$-$C_{40}$) alpha-olefin) copolymer, or a combination (e.g., blend or melt mixture) of any two or more thereof. The LDPE may have a density from 0.910 to 0.925 g/cm³. The LLDPE may have a density from 0.910 to 0.925 g/cm³. The MDPE may have a density from 0.926 to 0.940 g/cm³. The HDPE may have a density from 0.941 to 0.990 g/cm³. The elastomers based on ethylene copolymers may be selected from the EPR and EBR, alternatively the EPR and EOR, alternatively the EBR and EOR, alternatively EPR, alternatively EBR, alternatively EOR. Examples of such elastomers are ENGAGE™, AFFINITY™, and INFUSE™ polyolefin elastomers available from The Dow Chemical Company. The ethylene/($C_3$-$C_{20}$) alpha-olefin) copolymer may be an ethylene/propylene copolymer or an ethylene/($C_4$-$C_{20}$) alpha-olefin) copolymer as described herein. The ethylene-propylene copolymer (EPP) may be a bipolymer or an ethylene-propylene-diene monomer (EPDM) copolymer. The (C) EBC polyolefin compound may be different than the (A) semi-crystalline polyolefin carrier resin and the (L) ethylene-based polymer additive in at least one characteristic selected from monomer composition, comonomer composition, density, crystallinity, melt index, melt flow rate, number-average molecular weight (Mn), weight-average molecular weight (Mw), molecular weight distribution (Mw/Mn), and porosity.

Prior to the mixing step used to prepare the EBC formulation, the (C) EBC polyolefin compound may be in a divided solid form such as a powder, granules and/or pellets.

Optional constituent (additive) (D) flame retardant. The (D) flame retardant is a compound that inhibits or delays the spread of fire by suppressing chemical reactions in a flame. In some aspects (D) flame retardant is (D1) a mineral, (D2) an organohalogen compound, (D3) an (organo) phosphorous compound; (D4) a halogenated silicone; or (D5) a combination of any two or more of (D1) to (D4). In some aspects (D) is not present in the inventive masterbatch, formulation, and/or product. In some aspects (D) is present in the inventive masterbatch, formulation, and/or product at a concentration from 0.1 to 20 wt %, alternatively 1 to 10 wt %; and alternatively 5 to 20 wt %; all based on total weight thereof.

Optional constituent (additive) (E) antioxidant. A compound for inhibiting oxidation of a polyolefin. Examples of suitable second antioxidants are polymerized 1,2-dihydro-2,2,4-trimethylquinoline (Agerite MA); tris(4-tert-butyl-3-hydroxy-2,6-dimethylbenzyl)-s-triazine-2,4,6-(1H,3H,5H) trione (Cyanox 1790); distearyl-3,3-thiodiproprionate (DSTDP); tetrakismethylene (3,5-di-tert-butyl-4-hydroxy-hydrocinnamate) methane (Irganox 1010); 1,2-bis(3,5-di-tert-butyl-4-hydroxyhydrocinnamoyl) hydrazine (Irganox 1024); bis(4,6-dimethylphenyl) isobutylidene (Lowinox 22IB46); and 4,4-thiobis(2-tert-butyl-5-methylphenol) (TBM6). In some aspects (E) is not present in the inventive masterbatch, formulation, and/or product. In some aspects (E) is present in the inventive masterbatch, formulation, and/or product at a concentration of from 0.01 to 10 wt %, alternatively 0.05 to 5 wt %, alternatively 0.1 to 3 wt %, based on total weight thereof.

Optional constituent (additive) (F) processing aid. Constituent (F) may improve flow of a melt of the coagent masterbatch through a machine. (F) may be an organic processing aid such as a fluoropolymer or a silicone processing aid such as a polyorganosiloxane or fluoro-functionalized polyorganosiloxane. In some aspects (F) is not present in the inventive masterbatch, formulation, and/or product. In some aspects (F) is present in the inventive masterbatch, formulation, and/or product at a concentration of from 1 to 20 wt %, alternatively 2 to 18 wt %, alternatively 3 to 15 wt %, based on total weight thereof.

Optional constituent (additive) (G) a colorant. E.g., a pigment or dye. E.g., carbon black or titanium dioxide. The carbon black may be provided as a carbon black masterbatch that is a formulation of poly(1-butene-co-ethylene) copolymer (from ≥95 wt % to <100 wt % of the total weight of the masterbatch) and carbon black (from >0 wt % to ≤5 wt % of the total weight of the carbon black masterbatch. In some aspects (G) is not present in the inventive masterbatch, formulation, and/or product. In some aspects (G) colorant is present in the inventive masterbatch, formulation, and/or product at from 0.1 to 35 wt %, alternatively 1 to 10 wt %, based on total weight thereof.

Optional constituent (additive) (H) a metal deactivator. E.g., oxaylyl bis(benzylidene hydrazide) (OABH). In some aspects (H) is not present in the inventive masterbatch, formulation, and/or product. In some aspects (H) is present in the inventive masterbatch, formulation, and/or product at from 0.001 to 0.2 wt %, alternatively 0.01 to 0.15 wt %, alternatively 0.01 to 0.10 wt %, all based on total weight thereof.

Optional constituent (additive) (I) (unsaturated carbon-carbon bond)-free hydrolyzable silane. Useful for scavenging moisture. Constituent (I) may be any monosilane containing at least 1, alternatively at least 2, alternatively at least 3, alternatively 4 hydrolyzable groups (e.g., $R^2$ as defined above); and at most 3, alternatively at most 2, alternatively at most 1, alternatively 0 non-hydrolyzable (unsaturated carbon-carbon bond)-free groups such as alkyl or aryl groups. Examples of (I) are acetoxytrimethylsilane, 4-benzylphenylsulfonoxytributylsilane, dimethylamino-methoxy-dioctylsilane, octyltrimethoxysilane, and tetramethoxysilane. In some aspects (I) is not present in the inventive masterbatch, formulation, and/or product. In some aspects (I) is present in the inventive masterbatch, formulation, and/or product at from 0.1 to 2 wt %, alternatively 0.1 to 1.5 wt %, alternatively 0.1 to 1.0 wt %; all based on total weight thereof.

Optional constituent (additive) (J) a corrosion inhibitor. E.g., tin (II) sulfate. In some aspects (J) is not present in the inventive masterbatch, formulation, and/or product. In some aspects (J) is present in the inventive masterbatch, formulation, and/or product at from 0.00001 to 0.1 wt %, alternatively 0.0001 to 0.01 wt %, based on total weight thereof.

Optional constituent (additive) (K) hindered amine light stabilizer. The (K) is a compound that inhibits oxidative degradation. Examples of suitable (K) are butanedioic acid dimethyl ester, polymer with 4-hydroxy-2,2,6,6-tetramethyl-1-piperidine-ethanol (CAS No. 65447-77-0, commercially LOWILITE 62); and poly[6-[(1,1,3,3-tetramethyl-butyl)amino]-1,3,5-triazine-2,4-diyl][(2,2,6,6-tetramethyl-4-piperidinyl)imino]-1,6 hexanediyl[(2,2,6,6-tetramethyl-4-piperidinyl)imino]]) (CAS 71878-19-8/70624-18-9, Chimassorb 994 LD, BASF) In some aspects (K) is not present in the inventive masterbatch, formulation, and/or product. In some aspects (K) is present in the inventive masterbatch, formulation, and/or product at from 0.001 to 0.2 wt %, alternatively 0.01 to 0.15 wt %, alternatively 0.01 to 0.10 wt %, all based on total weight thereof.

Optional constituent (additive) (L) ethylene-based copolymer additive. The constituent (L) is different than constituents (A) and (C). (L) is an LDPE, an ethylene/alpha-olefin copolymer, an ethylene/unsaturated carboxylic ester copolymer (e.g., ethylene/vinyl acetate (EVA) copolymer, ethylene/ethyl acrylate (EEA) copolymer, or ethylene/ethyl methacrylate (EEMA) copolymer). In some aspects (L) is not present in the inventive masterbatch, formulation, and/or product. In some aspects (L) is present in the inventive masterbatch, formulation, and/or product at a concentration from 0.1 to 20 wt %, alternatively 1 to 10 wt %; and alternatively 5 to 20 wt %; all based on total weight thereof.

Other optional constituents. In some aspects the inventive masterbatch, formulation, and/or product does not contain any optional constituents. In some aspects the inventive masterbatch, formulation, and/or product does not contain any optional constituents other than constituents (D) to (L). In some aspects the inventive masterbatch, formulation, and/or product further contains at least one optional constituent (additive) in addition to or in place of (D) to (L). For example, a lubricant or an anti-blocking agent.

Any optional constituent may be useful for imparting at least one characteristic or property to the inventive masterbatch, formulation, and/or product in need thereof. The characteristic or property may be useful for improving performance of the inventive masterbatch, formulation, and/or product in operations or applications wherein the inventive masterbatch, formulation, and/or product is exposed to elevated operating temperature. Such operations or applications include melt mixing, extrusion, molding, hot water pipe, and insulation layer of an electrical power cable.

$(C_3-C_{20})$ alpha-olefin and $(C_3-C_{20})$ alpha-olefin. A compound of formula (I): $H_2C=C(H)-R$ (I), wherein R is either a straight chain $(C_1-C_{18})$alkyl group or a straight chain $(C_2-C_{18})$alkyl group, respectively. The $(C_3)$ alpha-olefin is 1-propene and its R group in formula (I) is methyl. The $(C_2-C_{18})$alkyl group is a monovalent unsubstituted saturated hydrocarbon having from 2 to 18 carbon atoms. Examples of $(C_2-C_{18})$alkyl are ethyl, propyl, butyl, pentyl, hexyl, heptyl, octyl, nonyl, decyl, undecyl, dodecyl, tridecyl, tetradecyl, pentadecyl, hexadecyl, heptadecyl, and octadecyl. In some embodiments the $(C_4-C_{20})$ alpha-olefin is 1-butene, 1-hexene, or 1-octene; alternatively 1-butene, 1-hexene, or 1-octene; alternatively 1-butene or 1-hexene; alternatively 1-butene or 1-octene; alternatively 1-hexene or 1-octene; alternatively 1-butene; alternatively 1-hexene; alternatively 1-octene; alternatively a combination of any two of 1-butene, 1-hexene, and 1-octene.

Any compound herein includes all its isotopic forms, including natural abundance forms and/or isotopically-enriched forms, which may have additional uses, such as medical or anti-counterfeiting applications.

Method of electron-beam irradiation curing. The method may comprise electron-beam irradiating the EBC formulation with an effective dose of electron-beam irradiation. The effective dose of electron-beam irradiation may be from 49 to 201 kilojoules energy per kilogram of EBC formulation (KJ/kg), alternatively from 49 to 160 KJ/kg, alternatively from 80 to 201 KJ/kg, alternatively from 80 to 160 KJ/kg, alternatively from 50 to 80 KJ/kg, alternatively from 100 to 140 KJ/kg, alternatively from 160 to 201 KJ/kg. The electron-beam irradiation may be produced using an E-beam accelerator machine such as an Aibang AB5.0 machine available from Wuxi Aibang Radiation Technology Company, Limited, People's Republic of China. The electron-beam irradiating step may be conducted at any suitable temperature such as from 10° to 50° C. (e.g., 23° C.±1° C.), under any suitable atmosphere such as air or molecular nitrogen gas, and for any suitable length of time such as from 0.1 to 20 minutes, alternatively from 0.1 to 10 minutes, alternatively from 0.1 to 5 minutes. The irradiation may be dosed continuously or intermittently, alternatively continuously.

The following apply unless indicated otherwise. Alternatively precedes a distinct embodiment. ASTM means the standards organization, ASTM International, West Conshohocken, Pennsylvania, USA. IEC means the standards organization, International Electrotechnical Commission, Geneva, Switzerland. Any comparative example is used for illustration purposes only and shall not be prior art. Free of or lacks means a complete absence of; alternatively not detectable. IUPAC is International Union of Pure and Applied Chemistry (IUPAC Secretariat, Research Triangle Park, North Carolina, USA). May confers a permitted choice, not an imperative. Operative means functionally capable or effective. Optional(ly) means is absent (or excluded), alternatively is present (or included). PPM are weight based. Properties are measured using a standard test method and conditions for the measuring (e.g., viscosity: 23° C. and 101.3 kPa). Ranges include endpoints, subranges, and whole and/or fractional values subsumed therein, except a range of integers does not include fractional values. Room temperature is 23° C.±1° C. Substituted when referring to a compound means having, in place of hydrogen, one or more substituents, up to and including per substitution. Comonomer composition distribution may be characterized by the CDBI Method.

Comonomer Distribution Breadth Index (CDBI) Method: Methods for calculating CDBI values of copolymers are known in the art, such as in WO 93/03093. A CDBI value of a copolymer is readily calculated by data obtained from techniques known in the art, such as, for example, TREF (temperature rising elution fractionation) as described, for example, in U.S. Pat. No. 5,008,204 or in Wild et al., J. Poly. Sci. Polv. Phys. Ed., vol. 20, p. 441 (1982). The CDBI Method is as described in paragraphs to of U.S. provisional patent application No. 62/478,163 filed Mar. 29, 2017, and its corresponding PCT International patent application number PCT/US2018/021282 filed Mar. 7, 2018.

Crystallinity Test Method. For determining crystallinity in wt % of a semi-crystalline polyolefin resin such as (A) semi-crystalline polyolefin carrier resin. Determine melting peaks and weight percent (wt %) crystallinity using DSC instrument DSC Q1000 (TA Instruments) as follows. Procedure (A) Baseline calibrate instrument. Use software calibration wizard. First obtain a baseline by heating a cell from −80° to 280° C. without any sample in an aluminum DSC pan. Then use sapphire standards as instructed by the calibration wizard. The analyze 1 to 2 milligrams (mg) of a fresh indium sample by heating the standards sample to 180° C., cooling to 120° C. at a cooling rate of 10° C./minute, then keeping the standards sample isothermally at 120° C. for 1 minute, followed by heating the standards sample from 120° to 180° C. at a heating rate of 10° C./minute. Determine that indium standards sample has heat of fusion $(H_f)$=28.71±0.50 Joules per gram (J/g) and onset of melting=156.6°±0.5° C. Perform DSC measurements on test samples using same DSC instrument. For polyethylene test samples see procedure (B) below. For polypropylene test samples see procedure (C) below. Weight percent crystallinity values determined using DSC will be approximately 3 wt % lower than weight percent crystallinity values determined according to a method based on density of the semi-crystalline polyolefin.

Procedure (B) DSC on Polyethylene Test Samples. Press test sample of polymer into a thin film at a temperature of 160° C. Weigh 5 to 8 mg of test sample film in DSC pan. Crimp lid on pan to seal pan and ensure closed atmosphere. Place sealed pan in DSC cell, equilibrate cell at 30° C., and heat at a rate of about 100° C./minute to 140° C., keep sample at 140° C. for 1 minute, cool sample at a rate of 10° C./minute to 0° C. or lower (e.g., −40° C.) to obtain a cool curve heat of fusion ($H_f$), and keep isothermally at 0° C. or lower (e.g., −40° C.) for 3 minutes. Then heat sample again at a rate of 10° C./minute to 180° C. to obtain a second heating curve heat of fusion ($\Delta H_f$). Using the resulting curves, calculate the cool curve heat of fusion (J/g) by integrating from the beginning of crystallization to 10° C. Calculate the second heating curve heat of fusion (J/g) by integrating from 10° C. to the end of melting. Measure weight percent crystallinity (wt % crystallinity) of the polymer from the test sample's second heating curve heat of fusion ($\Delta H_f$) and its normalization to the heat of fusion of 100% crystalline polyethylene, where wt % crystallinity=($\Delta H_f$*100%)/292 J/g, wherein $\Delta H_f$ is as defined above, * indicates mathematical multiplication, / indicates mathematical division, and 292 J/g is a literature value of heat of fusion ($\Delta H_f$) for a 100% crystalline polyethylene.

Procedure (C) DSC on Polypropylene Test Samples. Press test sample of polypropylene into a thin film at a temperature of 210° C. Weigh 5 to 8 mg of test sample film in DSC pan. Crimp lid on pan to seal pan and ensure closed atmosphere. Place sealed pan in DSC cell and heat at a rate of about 100° C./minute to 230° C., keep sample at 230° C. for 5 minutes, cool sample at a rate of 10° C./minute to −20° C. to obtain a cool curve heat of fusion, and keep isothermally at −20° C. for 5 minutes. Then heat sample again at a rate of 10° C./minute until melting is complete to obtain a second heating curve heat of fusion (($\Delta H_f$)). Using the resulting curves, calculate the cool curve heat of fusion (J/g) by integrating from the beginning of crystallization to 10° C. Calculate the second heating curve heat of fusion (J/g) by integrating from 10° C. to the end of melting. Measure weight percent crystallinity (wt % crystallinity) of the polymer from the test sample's second heating curve heat of fusion ($\Delta H_f$) and its normalization to the heat of fusion of 100% crystalline polypropylene, where wt % crystallinity=($\Delta H_f$*100%)/165 J/g, wherein $\Delta H_f$ is as defined above, * indicates mathematical multiplication, / indicates mathematical division, and 165 J/g is a literature value of heat of fusion ($\Delta H_f$) for a 100% crystalline polypropylene.

Density Test Method: measured according to ASTM D792-13, *Standard Test Methods for Density and Specific Gravity (Relative Density) of Plastics by Displacement*, Method B (for testing solid plastics in liquids other than water, e.g., in liquid 2-propanol). Report results in units of grams per cubic centimeter (g/cm$^3$).

Hot Creep (Hot Set) Test Method: A test sample (dogbone-shaped of specified dimensions in ASTM 638-34; thickness <2 millimeter (mm); marker lines 20 mm apart) is placed in an oven at 200° C., and to the test sample is attached a weight equal to a force of 20 Newtons per square centimeter (N/cm$^2$). Elongation of the test sample (distance between marker lines) under these conditions is then measured, and expressed as a percentage of the initial 20 mm distance. To illustrate, if the distance between marker lines widens to 40 mm, the hot creep is 100% (100*(40−20)/20 =100%), if widens to 100 mm, the hot creep is 400%. All other things being equal, the lower the level of crosslinking in the test sample, the greater the extent of elongation thereof in the Hot Creep Test Method. Conversely, the higher the level of crosslinking in the test sample, the lesser the extent of elongation thereof. If the level of crosslinking in the test sample is low enough, the test sample can fail by breaking, which may occur within a few minutes or even seconds of start of its testing run. Although power cables may not experience operating temperatures as high as 200° C., this test is a reliable way for the industry to evaluate materials for use in insulation layers thereof. The lower the hot creep percent, the better the performance of the material. In the power cable industry, a hot creep of less than 175% after the test sample has been held for 15 minutes at 200° C. passes the hot creep test. And a hot creep of less than 100% after 15 minutes at 200° C. is especially desirable. If the test sample is intact after 15 minutes, the weight is removed, the test sample is removed from the oven and allowed to cool to room temperature. Residual elongation of the test sample after cooling is measured. For a power cable, the residual elongation at room temperature should be less than 15% of the hot creep value measured at 200° C.

Melt Flow Rate (230° C., 2.16 kilograms (kg), "MFR") Test Method: for propylene-based (co) polymer is measured according to ASTM D1238-13, using conditions of 230° C./2.16 kg, formerly known as "Condition E" and also known as MFR. Report results in units of grams eluted per 10 minutes (g/10 min.) or the equivalent in decigrams per 1.0 minute (dg/1 min.). 10.0 dg=1.00 g.

Melt Index (190° C., 2.16 kilograms (kg), "$I_2$") Test Method: for ethylene-based (co) polymer is measured according to ASTM D1238-13, using conditions of 190° C./2.16 kg, formerly known as "Condition E" and also known as $I_2$. Report results in units of grams eluted per 10 minutes (g/10 min.) or the equivalent in decigrams per 1.0 minute (dg/1 min.). 10.0 dg=1.00 g.

Sweat Out Test Method (Qualitative): prepare HDPE pellets containing coagent as described later for the inventive masterbatch examples (e.g., IE1 to IE4). Prepare LLDPE pellets containing coagent as described later for comparative EBC formulations CE1 to CE5. Add each pellets sample to a separate, unused press-sealed polyethylene plastic bag (also known as zip lock or click seal bags). Seal bags. Press pellets in bags. Store bags and contents at room temperature for 14 days. At 14 days observe bags for oil traces left over on the bags' surfaces under light. Oil trace indicates surface migration and poor solubility. More oil trace on surface of bag, more TAIC sweat-out. Rank progressive amount of sweat out by characterizing the oil trace as none, very little, little, or obvious (more than a little).

Sweat Out Test Method (Quantitative): prepare HDPE pellets or LLDPE pellets as described above for the qualitative test method. Using thermogravimetric analysis (TGA) measure the initial loading of coagent on a freshly prepared pellet. Each pellet weighs 20 to 30 mg and is approximately dimensioned 4 mm×2.5 mm in volume. Store the pellets for 20 days at room temperature. At 20 days, wash a sample of the stored pellets with acetonitrile (ACN) as per the following procedure: (1) weigh 3.000 g±0.001 g of pellets sample into a 40 mL vial. (2) Feed 14.5 mL of ACN into the 40 mL vial. (3) Seal the vial with a rubber-lined cap, and shake the sealed vial on a shaker for 5 minutes. After shaking analyze the washed pellets sample by TGA again to get the coagent content in the washed pellets. Calculate the percent reduction of coagent content in the washed pellets by comparing the initial coagent loading in the fresh pellet to the coagent content in the washed pellet. Quantify the percent migration of coagent in the HDPE or LLDPE compound as equal to the coagent content reduction (%) of the pellets after the storage.

EXAMPLES

Semi-crystalline polyolefin carrier resin (A1): a HDPE having a density of 0.965 g/cc$^3$, a melt index (I$_2$) of 7.5 to 8.5 g/10 min.; and a monomodal MWD. By the Crystallinity Test Method parts (A) and (B), resin (A1) had a second heating curve heat of fusion ($\Delta H_f$) of 223.7 J/g, and a corresponding crystallinity of 76.6 wt %. Available as product AXELERON™ CX 6944 NT CPD from The Dow Chemical Company.

Alkylene-functional coagent (B1): triallyl isocyanurate (TAIC).

Alkenyl-functional coagent (B2): tetramethyl-tetravinyl-cyclotetrasiloxane (ViD4).

Alkenyl-functional coagent (B3): trimethylolpropane trimethylacrylate ("TMPTMA").

Alkenyl-functional coagent (B4): triallyl cyanurate (TAC).

EBC polyolefin compound (C1): an ethylene/1-butene LLDPE (C1), stabilized with metal deactivator (H1) oxayyl bis(benzylidene hydrazide (OABH) and two antioxidants, and has a density of 0.921 g/cc$^3$, melt index (I$_2$) of 0.7 g/10 min., and a monomodal MWD. Available as pellets as product DFDA-7540 NT from The Dow Chemical Company.

Comparative Examples 1 and 2 (CE1 and CE2): two comparative EBC formulations are prepared by soaking LLDPE (C1) pellets with one of coagent (B1) 80° C. for 6 hours in an oven to allow coagent to penetrate into the LLDPE pellets.

Comparative Examples 3 to 5 (CE3 to CE5): three comparative EBC formulations are prepared separately by compounding. Feed LLDPE (C1) to a Brabender mixer at 120° C. Allow the LLDPE (C1) to melt completely at a rotor speed of 35 rotations per minute (rpm). Then gradually add one of coagents (B2) to (B4), respectively, over 15 minutes, and melt mix the resulting mixture at 35 rpm for 4 minutes. Then stop the rotation, remove the mixed EBC formulation (one of CE3 to CE5) from the Brabender mixer. Promptly hot press the formulation at 120° C. to shape the formulation CE3, CE4, or CE5 as a 1-millimeter (mm) thick sheet.

Comparative Examples 6 and 7: comparative cured polyolefin products prepared by separately hot pressing the formulation CE1 or CE2 at 120° C. to shape the formulation CE1 or CE2 as a 1-mm thick sheet, and then curing the sheet EBC formulations of CE1 and CE2, respectively, with 100 kilojoules per kilogram (KJ/kg) irradiation dose of electron-beam.

Inventive Examples 1 to 4 (IE1 to IE4): inventive coagent masterbatches MB1 to MB4. Melt mix HDPE (A1) and any one of coagents (B1) to (B4) in a Banbury compounder using a compounding temperature of 155° C., rotor speed of 60 to 65 rotations per minute (rpm), followed by extruding the melt of coagent masterbatch with air cooling to give extruded coagent masterbatch, and pelletizing the extruded coagent masterbatch to give coagent masterbatch of IE1 to IE4 as pellets.

Inventive Examples 5 to 6: inventive EBC formulations EBCF1 to EBCF2.

Inventive Examples 7 and 8: inventive cured polyolefin products prepared by curing the EBC formulations EBCF1 and EBCF2 of IE5 and IE6, respectively, with 100 kilojoules per kilogram (kJ/kg) irradiation dose of electron-beam.

See Table 1 later for composition information for comparative EBC formulations CE1 to CE5. See Table 2 later for composition information for masterbatches MB1 to MB4 of IE1 to IE4. See Table 3 later for composition information for inventive EBC formulations EBCF1 to EBCF2 of IE5 to IE6. See Table 4 later for sweat out results for CE1 to CE5. See Table 5 later for sweat out results for IE1 to IE6. See Table 6 later for hot creep test results for CE6 and CE7 and IE7 and IE8.

TABLE 1

Compositions (wt %): Comparative EBC Formulations CE1 to CE5.

| Ex. No. | CE1 | CE2 | CE3 | CE4 | CE5 |
|---|---|---|---|---|---|
| HDPE (A1) | 0 | 0 | 0 | 0 | 0 |
| TAIC (B1) | 0.5 | 0.8 | 0 | 0 | 0 |
| ViD4 (B2) | 0 | 0 | 13 | 0 | 0 |
| TMPTMA (B3) | 0 | 0 | 0 | 13 | 0 |
| TAC (B4) | 0 | 0 | 0 | 0 | 13 |
| LLDPE (C1) | 99.5 | 99.2 | 87 | 87 | 87 |
| Total | 100.00 | 100.00 | 100.00 | 100.00 | 100.00 |
| Coagent and Loading (wt %) | TAIC (0.5) | TAIC (0.8) | ViD4 (13) | TMPTMA (13) | TAC (13) |

TABLE 2

Compositions (wt %): Inventive Coagent Masterbatches MB1 to MB4 of IE1 to IE4, respectively.

| Ex. No. | IE1 | IE2 | IE3 | IE4 |
|---|---|---|---|---|
| HDPE (A1) | 85 | 87 | 87 | 87 |
| TAIC (B1) | 15 | 0 | 0 | 0 |
| ViD4 (B2) | 0 | 13 | 0 | 0 |
| TMPTMA (B3) | 0 | 0 | 13 | 0 |
| TAC (B4) | 0 | 0 | 0 | 13 |
| Masterbatch Total wt % | 100.00 | 100.00 | 100.00 | 100.00 |

TABLE 3

Compositions (wt %): Inventive EBC Formulations EBCF1 to EBCF2 made with inventive Coagent Masterbatches MB1.

| Ex. No. | IE5 | IE6 |
|---|---|---|
| MB1 (IE1) | 8 | 40 |
| MB2 (IE2) | 0 | 0 |
| MB3 (IE3) | 0 | 0 |
| MB4 (IE4) | 0 | 0 |
| LLDPE (C1) | 92 | 60 |
| EBC Formulation Total | 100.00 | 100.00 |
| Coagent and loading (wt %) | TAIC (1.2) | TAIC (6) |

TABLE 4

Sweat out Results for Comparative EBC Formulations CE1 to CE5.

| Ex. No. | CE1 | CE2 | CE3 | CE4 | CE5 |
|---|---|---|---|---|---|
| Test Material | EBC Formulation | EBC Formulation | EBC Formulation | EBC Formulation | EBC Formulation |

TABLE 4-continued

Sweat out Results for Comparative EBC Formulations CE1 to CE5.

| Ex. No. | CE1 | CE2 | CE3 | CE4 | CE5 |
|---|---|---|---|---|---|
| Sweat Out amount coagent lost | Very little | Yes, obvious | >5% | >50% | >10% |
| Sweat Out Test Method | Qualitative | Qualitative | Quantitative | Quantitative | Quantitative |

TABLE 5

Sweat out Results for Inventive EBC Formulations EBCF1 to EBCF2 and inventive Coagent Masterbatches MB2 to MB4.

| Ex. No. | IE2 | IE3 | IE4 | IE5 | IE6 |
|---|---|---|---|---|---|
| Test Material | MB2 | MB3 | MB4 | EBCF1 | EBCF2 |
| Sweat Out amount coagent lost (test period) | 0% | 0% | 0% | None | None |
| Sweat Out Test Method | Quantitative | Quantitative | Quantitative | Qualitative | Qualitative |

The sweat out data in Tables 4 and 5 show that the inventive coagent masterbatch is significantly better and preventing sweat out of alkenyl-functional coagent therefrom at room temperature than is an LLDPE/coagent mixture.

TABLE 6

Hot Creep Results for comparative cured polyolefin products CE6 and CE7 and inventive cured polyolefin products IE7 and IE8.

| Ex. No. | CE6 | CE7 | IE7 | IE8 |
|---|---|---|---|---|
| Pre-cure TAIC loading in EBC Formulation (wt %) | 0.5 | 0.8 | 1.2 | 6 |
| Cured* Test Material | Product of curing EBC Formulation of CE1 | Product of curing EBC Formulation of CE2 | Product of curing EBCF1 | Product of curing EBCF2 |
| Hot Creep** | 250% | 150% | 80% | 35% |
| Hot Creep <175%? | Fail | pass | Pass | Pass |
| Hot Creep <100%? | Fail | Fail | Pass | Pass |

*curing = 100 kilojoules per kilogram (kJ/kg) irradiation dose of electron-beam irradiation;
**Hot Creep: measured at 200° C. on electron-beam cured test material.

*curing=100 kilojoules per kilogram (KJ/kg) irradiation dose of electron-beam irradiation; ** Hot Creep: measured at 200° C. on electron-beam cured test material.

The hot creep data in Table 6 show that the inventive EBC formulations, which contain the inventive masterbatch, are significantly better at curing to give inventive cured polyolefin products having improved (decreased) hot creep at 200° C. than are comparative cured polyolefin products prepared from comparative EBC formulations that contain the same alkenyl-functional coagent but do not contain the inventive masterbatch. The TAIC loading in the comparative EBC formulations is lower due to TAIC sweat out limits than is the TAIC loading in the inventive EBC formulations, which do not have such sweat out limits. The higher TAIC loading in the inventive EBC formulations show the beneficial effect of increasing electron-beam curing efficiency of the inventive curing method.

The invention claimed is:

1. A coated conductor, comprising a conductive core and a polymeric layer at least partially surrounding the conductive core, wherein at least a portion of the polymeric layer comprises an electron-beam-cured polyolefin product made by irradiating an (electron beam)-curable formulation with an effective dose of electron beam irradiation so as to give an electron-beam cured polyolefin product, further wherein the (electron beam)-curable formulation comprises a coagent masterbatch and (C) an electron-beam curable (EBC) polyolefin compound; wherein the coagent masterbatch comprises (A) a semi-crystalline polyolefin carrier resin and (B) an alkylene-functional coagent disposed in the (A) semi-crystalline polyolefin carrier resin; wherein (A) is 80.0 to 90.0 weight percent (wt %) and (B) is from 20.0 to 10.0 wt % of the combined weight of constituents (A) and (B); wherein the (A) semi-crystalline polyolefin carrier resin has a crystallinity of from 55.0 to less than 100 weight percent (wt %) as measured by Crystallinity Test Method using differential scanning calorimetry (DSC); wherein when the (A) semi-crystalline polyolefin carrier resin is a semi-crystalline polyethylene, the semi-crystalline polyethylene has a density of greater than 0.935 gram per cubic centimeter (g/cm$^3$); wherein the (electron beam)-curable formulation is free of a peroxide.

2. The coated conductor of claim 1 wherein the (A) semi-crystalline polyolefin carrier resin comprises any one of (i) to (viii): (i) a semi-crystalline medium density polyethylene; (ii) a semi-crystalline high density polyethylene; (iii) a semi-crystalline polypropylene; (iv) a semi-crystalline ethylene/propylene copolymer; (v) a semi-crystalline poly(ethylene-co-alpha-olefin) copolymer; (vi) a combination of any two or more of (i), (ii) and (v); (vii) the (A) semi-crystalline polyolefin carrier resin has a crystallinity of 57.5 to <100 wt % (Crystallinity Test Method using DSC); or (viii) limitation (vii) and any one of limitations (i) to (vi).

3. The coated conductor (electron beam) curable formulation of claim 1 wherein the (A) semi-crystalline polyolefin carrier resin has any one of (i) to (viii): (i) a density of greater than 0.936 g/cm$^3$ and is a polyethylene; (ii) a density of 0.89 to 0.946 g/cm$^3$ and is a polypropylene; (iii) a crystallinity of 60.0 to <100 wt % (Crystallinity Test Method using DSC) and is a polyethylene; (iv) a melt index (I$_2$, 190° C./2.16 kg load) of 0.1 to 20 grams per 10 minutes (g/10 min.) measured according to the Melt Index Test Method and is a polyethylene or a melt flow rate (MFR) of 0.5 to 20 g/10 min. (230° C./2.16 kg load) measured according to the Melt Flow Rate Test Method and is a polypropylene; (v) a molecular weight distribution (MWD) that is monomodal; (vi) a MWD that is multimodal; (vii) wherein the combined weight of constituents (A) and (B) is from 50 to 100 wt % of the coagent masterbatch; (viii) any two or more limitations (i) to (vii).

4. The coated conductor of claim 1 wherein the (B) alkenyl-functional coagent is as described by any one of limitations (i) to (viii): (i) (B) is 2-allylphenyl allyl ether; 4-isopropenyl-2,6-dimethylphenyl allyl ether; 2,6-dimethyl-4-allylphenyl allyl ether; 2-methoxy-4-allylphenyl allyl ether; 2,2'-diallyl bisphenol A; O,O'-diallyl bisphenol A; or tetramethyl diallylbisphenol A; (ii) (B) is 2,4-diphenyl-4-methyl-1-pentene or 1,3-diisopropenylbenzene; (iii) (B) is triallyl isocyanurate; triallyl cyanurate; triallyl trimellitate; N,N,N',N',N'',N''-hexaallyl-1,3,5-triazine-2,4,6-triamine;

triallyl orthoformate; pentaerythritol triallyl ether; triallyl citrate; or triallyl aconitate; (iv) (B) is trimethylolpropane triacrylate, trimethylolpropane trimethylacrylate, ethoxylated bisphenol A dimethacrylate, 1,6-hexanediol diacrylate, pentaerythritol tetraacrylate, dipentaerythritol pentaacrylate, tris(2-hydroxyethyl) isocyanurate triacrylate, or propoxylated glyceryl triacrylate; (v) (B) is a polybutadiene having at least 50 wt % 1,2-vinyl content or trivinyl cyclohexane; (vi) (B) is an alkenyl-functional organosiloxane of formula (I): $[R^1,R^2SiO_{2/2}]_n$ (I), wherein subscript n is an integer greater than or equal to 3; each $R^1$ is independently a $(C_2-C_4)$alkenyl or a $H_2C=C(R^{1a})-C(=O)-O-(CH_2)_m-$ wherein $R^{1a}$ is H or methyl and subscript m is an integer from 1 to 4; and each $R^2$ is independently H, $(C_1-C_4)$alkyl, phenyl, or $R^1$; (vii) (B) is an alkenyl-functional monocyclic organosiloxane of formula (II): $(R^1)_xSi(OR^2)_{(4-x)}$ (II), wherein subscript x is an integer from 0 to 4; each $R^1$ is independently a $(C_2-C_4)$alkenyl or a $H_2C=C(R^{1a})-C(=O)-O-(CH_2)_m-$ wherein $R^{1a}$ is H or methyl and subscript m is an integer from 1 to 4; and each $R^2$ is independently H, $(C_1-C_4)$alkyl, phenyl, or $R^1$; with the proviso that the alkenyl-functional monocyclic organosiloxane of formula (II) contains from 2 to 4 $R^1$ groups; (viii) a combination of any two or more of (i) to (vii).

5. The coated conductor of claim 1 characterized by any one of limitations (i) to (xiii): (i) the (C) EBC polyolefin compound is a low density polyethylene (LDPE) having a density from 0.910 to 0.925 $g/cm^3$; (ii) the (C) EBC polyolefin compound is a linear low density polyethylene (LLDPE) having a density from 0.910 to 0.925 $g/cm^3$; (iii) the (C) EBC polyolefin compound is a medium density polyethylene (MDPE) having a density from 0.926 to 0.940 $g/cm^3$; (iv) the (C) EBC polyolefin compound is a high density polyethylene (HDPE) having a density from 0.941 to 0.990 $g/cm^3$; (v) the (C) EBC polyolefin compound is a polyethylene elastomer selected from an ethylene-propylene rubber (EPR), ethylene-1-butene rubber (EBR), and ethylene-1-octene rubber (EOR); (vi) the (C) EBC polyolefin compound is an ethylene/$(C_3-C_{20}$ alpha-olefin) copolymer; (vii) the (C) EBC polyolefin compound is an ethylene-propylene copolymer (EPP); (viii) the (C) EBC polyolefin compound is an ethylene-propylene-diene monomer (EPDM) copolymer; (ix) the (C) EBC polyolefin compound is a combination of any two or more of (i) to (viii); (x) the (electron beam)-curable formulation further comprises at least one additive that is not a constituent of the coagent masterbatch and is independently selected from optional additives (D) to (L): (D) a flame retardant, (E) an antioxidant, (F) a processing aid, (G) a colorant, (H) a metal deactivator, (I) an (unsaturated carbon-carbon bond)-free hydrolyzable silane, (J) a corrosion inhibitor, (K) a hindered amine light stabilizer, and (L) an ethylene-based copolymer additive that is different than constituents (A) and (C) and is an ethylene/$(C_4-C_{20}$) alpha-olefin copolymer, an ethylene/unsaturated carboxylic ester copolymer, or a propylene/ethylene-based copolymer; (xi) limitation (x) and any one of limitations (i) to (viii); (xii) (B) is from 0.1 to 20 wt % of the combined weight of constituents (A), (B) and (C); and (xiii) limitation (xii) and any one of limitations (i) to (xi).

* * * * *